(12) United States Patent
Mohanty et al.

(10) Patent No.: US 10,268,633 B2
(45) Date of Patent: Apr. 23, 2019

(54) SYSTEM AND METHOD FOR DATABASE MIGRATION WITH TARGET PLATFORM SCALABILITY

(71) Applicant: Wipro Limited, Bangalore (IN)

(72) Inventors: Suvakanta Mohanty, Bangalore (IN); Arun Kumar Annamalai, Salem DT (IN)

(73) Assignee: Wipro Limited, Bangalore (IN)

( * ) Notice: Subject to any disclaimer, the term of this patent is extended or adjusted under 35 U.S.C. 154(b) by 445 days.

(21) Appl. No.: 15/085,665

(22) Filed: Mar. 30, 2016

(65) Prior Publication Data

US 2017/0286412 A1    Oct. 5, 2017

(30) Foreign Application Priority Data

Mar. 29, 2016 (IN) .............................. 201641010891

(51) Int. Cl.
  *G06F 16/00*   (2019.01)
  *G06F 16/21*   (2019.01)
  *G06F 16/9032* (2019.01)
  *G06F 16/27*   (2019.01)

(52) U.S. Cl.
  CPC .......... *G06F 16/214* (2019.01); *G06F 16/211* (2019.01); *G06F 16/27* (2019.01); *G06F 16/90324* (2019.01)

(58) Field of Classification Search
  CPC ............. G06F 17/303; G06F 17/30292; G06F 17/30575; G06F 17/3097; G06F 16/214; G06F 16/27; G06F 16/211; G06F 16/90324; G06F 16/116; G06F 16/254; G06F 16/258; G06F 16/84
  See application file for complete search history.

(56) References Cited

U.S. PATENT DOCUMENTS

| | | | |
|---|---|---|---|
| 7,343,294 B1 * | 3/2008 | Sandholm | G06Q 10/0637 705/14.41 |
| 7,831,636 B2 * | 11/2010 | Wietlisbach | G06F 9/44505 707/803 |
| 8,515,919 B1 | 8/2013 | Patwardhan et al. | |
| 8,898,201 B1 * | 11/2014 | Drost | G06F 17/30079 707/803 |

(Continued)

OTHER PUBLICATIONS

Matthes et al., Testing & Quality Assurance in Data Migration Projects, 10 pages (Year: 2011).*

*Primary Examiner* — Noosha Arjomandi
(74) *Attorney, Agent, or Firm* — Pepper Hamilton LLP

(57) ABSTRACT

This disclosure relates generally to database migration, and more particularly to system and method for performing database migration such that the target database is optimized for scalability and performance. In one embodiment, a method is provided for performing a database migration from a source platform to a target platform. The method comprises analyzing a source data model on the source platform with respect to the database migration from the source platform to the target platform, determining at least one recommendation for optimizing at least one of a scalability or a performance of a target data model on the target platform based on the analyzing, deriving a database migration roadmap based on the analyzing and the at least one recommendation, and performing the database migration based on the database migration roadmap.

18 Claims, 2 Drawing Sheets

(56) References Cited

U.S. PATENT DOCUMENTS

| | | | |
|---|---|---|---|
| 9,195,696 B2 | 11/2015 | Smith | |
| 2007/0143373 A1* | 6/2007 | D'Souza | G06F 17/3056 |
| 2007/0162420 A1* | 7/2007 | Ou | G06F 16/27 |
| 2008/0235260 A1* | 9/2008 | Han | G06F 17/2247 |
| 2012/0254175 A1 | 10/2012 | Horowitz et al. | |
| 2013/0325812 A1* | 12/2013 | Carter | G06F 16/113 |
| | | | 707/661 |
| 2015/0019478 A1* | 1/2015 | Buehne | G06F 17/30079 |
| | | | 707/609 |
| 2015/0019487 A1* | 1/2015 | Buehne | G06F 17/30377 |
| | | | 707/632 |
| 2015/0149506 A1* | 5/2015 | Raizada | G06F 16/289 |
| | | | 707/792 |
| 2015/0370916 A1* | 12/2015 | Bostick | G06F 17/303 |
| | | | 707/809 |
| 2016/0142485 A1* | 5/2016 | Mitkar | H04L 67/1097 |
| | | | 707/681 |
| 2016/0267600 A1* | 9/2016 | Nagaraja | G06Q 40/06 |
| 2017/0373935 A1* | 12/2017 | Subramanian | H04L 41/0816 |
| 2018/0239828 A1* | 8/2018 | Lublinsky | G01C 21/32 |

\* cited by examiner

SYSTEM AND METHOD FOR DATABASE MIGRATION WITH TARGET PLATFORM SCALABILITY

This application claims the benefit of Indian Patent Application Serial No. 201641010891, filed Mar. 29, 2016, which is hereby incorporated by reference in its entirety.

FIELD

This disclosure relates generally to database migration, and more particularly to system and method for performing database migration such that the target database is optimized for scalability and performance.

BACKGROUND

In an increasingly interconnected and digital world, the volume of data is growing every year. For example, in today's global business environment, there are millions of business transactions performed every day, higher number of concurrent users, and exponential data growth. It is therefore highly desirable to capture and manage data across enterprise applications. Many a times, the existing systems employing legacy data platforms are lacking in successfully managing such high volume of data in terms of scalability and performance. This raises the need to re-evaluate existing data platform transformation and rationalization. Hence, database migration from one data platform to another platform becomes inevitable business imperative so as to improve performance and scalability of the database.

However, organizations are typically wary of database migration due to many challenges. For example, data structures do not get optimized during migration and is typically moved as-is into the target platform. Similarly, target data model is not optimized for performance and scalability and is typically migrated as-is. Further, insights about current data structures relationships and data distribution at the storage layer are not available. Further, data storage space does not get optimized for existing data.

It is necessary to understand existing database on the legacy data platforms and more importantly data structures of the existing database on the legacy data platforms in order to migrate database from the legacy platform to the target data platform. Further, it is crucial to keep data integrity or consistency intact while loading data into the target data platform and ensure that the target platform achieves scalability and performance, the sole purpose for which the database is migrated to the target platform. Additionally, it requires platform experts as well as database experts who know the best ways to migrate database optimized for target data platform. Even though few tools are available to facilitate database migration but no tool provides end-to-end solution to automate the entire database migration process across database platforms with scalability and performance optimizations on the target platform. Most of the tasks related to database migration and target platform optimization process typically get executed manually and is very effort intensive and costly.

SUMMARY

In one embodiment, a method for performing a database migration from a source platform to a target platform is disclosed. In one example, the method comprises analyzing a source data model on the source platform with respect to the database migration from the source platform to the target platform. The method further comprises determining at least one recommendation for optimizing at least one of a scalability or a performance of a target data model on the target platform based on the analyzing. The method further comprises deriving a database migration roadmap based on the analyzing and the at least one recommendation. The method further comprises performing the database migration based on the database migration roadmap.

In one embodiment, a system for performing a database migration from a source platform to a target platform is disclosed. In one example, the system comprises at least one processor and a memory communicatively coupled to the at least one processor. The memory stores processor-executable instructions, which, on execution, cause the processor to analyze a source data model on the source platform with respect to the database migration from the source platform to the target platform. The processor-executable instructions, on execution, further cause the processor to determine at least one recommendation for optimizing at least one of a scalability or a performance of a target data model on the target platform based on the analyzing. The processor-executable instructions, on execution, further cause the processor to derive a database migration roadmap based on the analyzing and the at least one recommendation. The processor-executable instructions, on execution, further cause the processor to perform the database migration based on the database migration roadmap.

In one embodiment, a non-transitory computer-readable medium storing computer-executable instructions for performing a database migration from a source platform to a target platform is disclosed. In one example, the stored instructions, when executed by a processor, cause the processor to perform operations comprising analyzing a source data model on the source platform with respect to the database migration from the source platform to the target platform. The operations further comprise determining at least one recommendation for optimizing at least one of a scalability or a performance of a target data model on the target platform based on the analyzing. The operations further comprise deriving a database migration roadmap based on the analyzing and the at least one recommendation. The operations further comprise performing the database migration based on the database migration roadmap.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
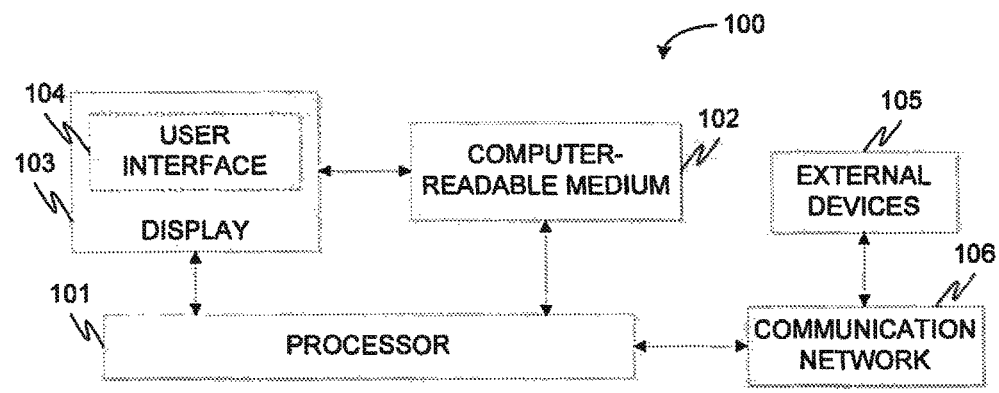
FIG. 1 is a block diagram of an exemplary system for performing database migration in accordance with some embodiments of the present disclosure.

Referring now to FIG. 1, an exemplary system 100 for performing database migration is illustrated in accordance with some embodiments of the present disclosure. In particular, the system 100 implements an optimized database platform migration engine for performing automated database migration such that a target data platform and a target database are optimized for scalability and performance, thereby eliminating the problem of iterative optimization performed on the target platform for scalability and performance subsequent to database migration. It should be noted that the target data platform and the target database are optimized for scalability and performance if they support higher data volume, more transactions, more users, and so forth. As will be described in greater detail in conjunction with FIG. 2, the optimized database platform migration engine analyzes a source data model on the source platform with respect to the database migration from the source platform to the target platform, determines one or more recommendations for optimizing at least one of a scalability or a performance of a target data model on the target platform based on the analysis, derives a database migration roadmap based on the analysis and the one or more recommendations, and performs the database migration based on the database migration roadmap.

The system 100 comprises one or more processors 101, a computer-readable medium (e.g., a memory) 102, and a display 103. The computer-readable storage medium 102 stores instructions that, when executed by the one or more processors 101, cause the one or more processors 101 to perform database migration in accordance with aspects of the present disclosure. The computer-readable storage medium 102 may also store various data (e.g., source data model, source database, target data model, target database, knowledge base, user inputs, rules, recommendations, database migration roadmap, automation scripts, migration reports, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
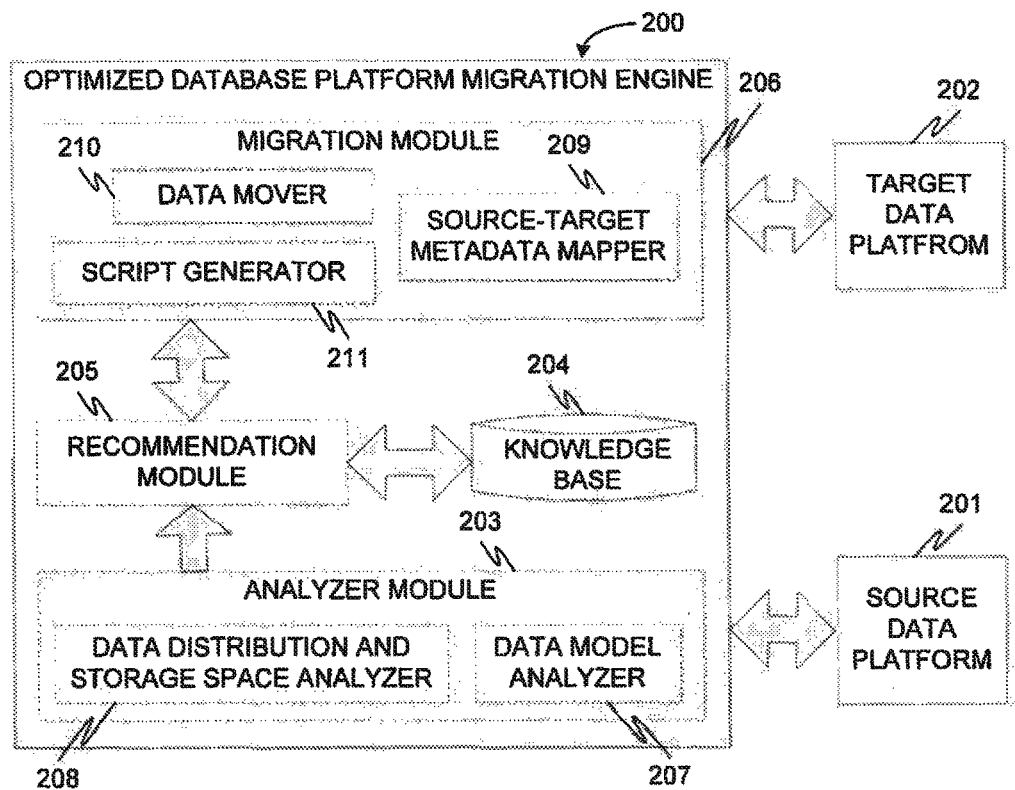
FIG. 2 is a functional block diagram of an optimized database platform migration engine in accordance with some embodiments of the present disclosure.

Referring now to FIG. 2, a functional block diagram of the optimized database platform migration engine 200 implemented by the system 100 of FIG. 1 is illustrated in accordance with some embodiments of the present disclosure. The optimized database platform migration engine 200 may include various modules that perform various functions so as to perform data migration from a source data platform 201 comprising of a source database to a target data platform 202. In some embodiments, the optimized database platform migration engine 200 comprises an analyzer module 203, a knowledge base 204, a recommendation module 205, and a migration module 206.

The analyzer module 203 gathers and analyzes information on a source data model on the source data platform 201 based on which the optimized database platform migration engine 200 determines optimization measures to be implemented in the target data platform 202. The analyzer module 203 comprises a data model analyzer 207 and a data distribution and storage space analyzer 208. The data model analyzer 207 analyzes the source physical data model objects with respect to data structure, different data entity types, different data entity sizes (e.g., length of the data types, maximum and average length of data stored in the columns), data indexes (e.g., primary indexes, secondary indexes), data partitioning (e.g., table partition, index partition, sub-partition), data entity relationships, data constraints, bitmap, data uniqueness, data integrity relationships, data views, resource utilization (e.g., I/O devices, memory, CPU, etc.), and so forth. The analyzed information is send to the recommendation module for decision making on the target platform optimization. As will be appreciated by those skilled in the art, the analysis performed on the source data model is captured so as to create target physical data model.

The data distribution and storage space analyzer 208 analyzes the data demographics and data storage pattern of the source data model. For example, the data distribution and storage space analyzer 208 may analyze the source data model to determine if any type of compression is applied in the source database. The parameters determined by this module 208 enables the optimized database platform migration engine 200 to determine different types of compression that may be employed in a target database on the target data platform subsequent to database migration such as table level compression, column level compression, algorithmic compression, block level compression, hybrid columnar compression, and so forth.

The knowledge base 204 comprises information with respect to various available data platforms and databases as well as various database migrations performed. In particular, the knowledge base 204 includes a set of best migration practices and a set of optimization processes maintained for each data platform and each database in the industry. It also includes knowledge about data migration gathered from the past database migrations performed such as those performed by the optimized database platform migration engine 200. In some embodiments, the knowledge in the knowledge base 204 is in the form of various pre-defined rules with respect to database migration practices and optimization processes for available data platforms and databases as well as for historical database migrations performed. The knowledge base 204 is updated periodically with the new migration practices and optimization processes that are introduced for various data platforms and databases in the industry as well as with the knowledge gained subsequent to various database migrations performed through the optimized database platform migration engine 200. In some embodiments, the update is based on intelligence gathered from industry releases or from historical database migrations performed by the optimized database platform migration engine 200.

The recommendation module 205 receives information from the analyzer module 203 (i.e., observations gathered and analyzed by the data model analyzer 207 and the data distribution and storage space analyzer 208). It then compares and/or analyzes the received information vis-à-vis the knowledge in the knowledge base 204 and accordingly determines various recommendations (i.e., optimization measures) to be implemented in the target data platform for optimizing scalability and/or performance of the target data model. For example, the recommendation module 205 compares the received information with respect to a set of optimization measures available in the knowledge base 204 for respective target data platform. The recommendation module 205 may also access the past migration reports of similar nature stored in the knowledge base 204 subsequent to every migration. It should be noted that, in some embodiments, the recommendations may include one or more rules with respect to a database migration practice and/or an optimization process to be implemented on the target platform 202.

In other words, the recommendation module 205 is a key decision making module that determines the optimization measures to be implemented by the optimized database platform migration engine 200 in the target fata platform as part of database migration process. The recommendation module 205 is an expert module that identifies and diagnoses bottlenecks to achieve performance and/or scalability in the target data platform and derives a solution approach for the database migration based on analyzing multiple source inputs. It should be noted that the recommendation module 205 also enhances the knowledge base 204 with highly accurate and precise knowledge based on any database migrations performed by the optimized database platform migration engine 200.

The migration module 206 performs end-to-end database migration between the source data platform 201 and the target data platform 202 based on the recommendations provided by the recommendation module 205 and/or the inputs provided by the analyzer module 203. The migration module 206 first derives a database migration roadmap based on the recommendations and the analysis, and then performs the database migration based on the database migration roadmap. The migration module 206 may include various modules that perform various functions such as scripts generation for optimized target physical model creation, data extraction from source data platform, database transformation as per database migration business rules and source-target mapping defined by the user, and data movement; optimized target physical data model creation; database migration to the target data platform as per business rules; detailed report generation on data reconciliation and database migration; collection of migration data, information, results and past migration experience to store in the knowledge base 204; and so forth.

In some embodiments, the migration module 206 comprises a source-target metadata mapper 209, a data mover 210, and a script generator 211. The source-target metadata mapper 209 for metadata mapping receives various inputs from the user for database migration such as transformation rules, any specific migration rules (e.g., full or range database migration), business rules, any changes to the data objects, any specific optimization measures that is to be included in the target data platform on top of system recommended optimization measures. These inputs may be collectively referred to as migration rules. The migration rules are considered by the optimized database platform migration engine 200 while deriving the database migration roadmap and are implemented as part of the database migration.

The data mover 210 determines efficient (e.g., faster) ways of loading the data into the target platform 202. The data loading and movement approach is finalized in the data mover 210 based on analysis of the source data platform 201 and the target data platform 202. In some embodiments, various optimized loading techniques such as direct path loading, parallel loading, fast loading, external table loading, export/import dumping may be considered with respect to the target data platform 202. The data loading and movement approach is determined while deriving the database migration roadmap and the optimized database platform migration engine 200 implements the same while performing the database migration.

The script generator 211 generates various scripts required for performing automated database migration from the source data platform 201 to the target data platform 202. The automated scripts are generated for the target data model creation, data extraction, data transformation, data conversion, data movement, data mapping, data loading, data reconciliation, data validation, and so forth. Additionally, the automated scripts are generated for data optimization for at least one of the scalability or the performance. Further, the automated scripts are generated while deriving the database migration roadmap and the optimized database platform migration engine 200 executes the same as part of the database migration. Moreover, in some embodiments, the script generator 211 determines an order of executing various automated scripts.

The automated scripts are then executed by the migration module 206 in general and the script generator 211 in particular so as to perform database migration from the source platform 201 to the target platform 202 in accordance with the database migration roadmap. It should be noted that the scripts may be executed in the determined order. In some embodiments, the database migration is performed by creating the target data model on the target platform, optimizing the target data model for at least one of the scalability or the performance, and performing the database migration based on the optimized target data model in accordance with one or more rules. Thus, for example, target data model creation scripts are executed to create the target physical data model, the data extraction scripts may be executed to extract the data from the source database, the data transformation and/or conversion scripts may be executed to transform and/or convert data, data movement or loading scripts may be executed to load data onto the target physical data model, and so forth. Further, data optimization scripts may be executed to optimize the target physical data model for scalability and the performance. Once the database migration is done, data validation scripts may be executed for error handling. Additionally, in some embodiments, data reconciliation scripts may be executed for data reconciliation and report generation. The report on the database migration may include information on the database migration and a data reconciliation performed after the database migration.

It should be noted that the optimized database platform migration engine 200 may be implemented in programmable hardware devices such as programmable gate arrays, programmable array logic, programmable logic devices, and so forth. Alternatively, the optimized database platform migration engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

Figure 3:
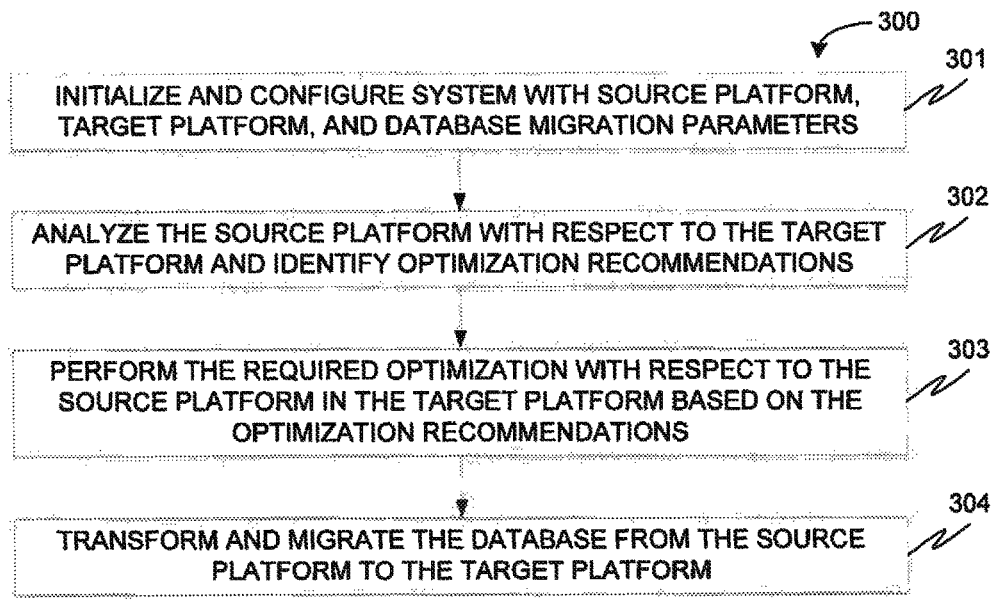
FIG. 3 is a flow diagram of an exemplary process overview for performing database migration in accordance with some embodiments of the present disclosure.

Referring now to FIG. 3, an overview of an exemplary process 300 for performing database migration is depicted via a flowchart in accordance with some embodiments of the present disclosure. The process 300 involves the steps of initializing and configuring the system with the source platform, the target platform and the database migration parameters at step 301, analyzing the source platform with respect to the target platform and identifying the optimization recommendations at step 302, performing the required optimization with respect to the source platform in the target platform based on the optimization recommendations at step 303, and transforming and migrating the database from the source platform to the target platform at step 304. Each of these steps will be described in greater detail herein below.

At step 301, the optimized database platform migration engine 200 implemented by the system 100 is initialized and configured with the source platform 201 and the target platform 202 details (e.g., operating system, database product, version, etc.) and the database migration parameters (e.g., source objects in scope, object types, connection parameters to the source database to initialize the system for database migration, etc.). These inputs are then provided to the analyzer module 203. Further, the knowledge base 204 is configured with pre-defined business rules related to the database best practices and optimization processes on query tuning, database and memory tuning, storage space tuning, data distribution methods, indexes tuning, and so forth for different database or data warehousing vendor products. The knowledge base 204 is also configured with knowledge derived from past database migrations.

At step 302, the data model analyzer 207, using the database migration parameter inputs, performs the source data model analysis to gather data on the objects like data structure, data entity types, data indexes, data partitioning, data constraints, data referential integrity checks, data views, data triggers, data demographics, data distribution, data space, storage consumed, resource utilization, resource intensive queries, and so forth. Similarly, the data distribution and storage space analyzer 208, using the migration parameter inputs, analyses the data demographics and storage pattern of the source data model and identifies recommendations to reduce storage space in the target data platform where the database is migrated. It also identifies improvements for the performance of the queries to be executed in the target database with specific recommendations with respect to the target platform.

At step 303, the analyzed information and identified recommendations from the analyzer module 203 is provided as input to the recommendation module 205. The recommendation module 205 then provides intelligent regarding scalability and performance optimization of the database on the target data platform 202. The recommendation module 205 finalizes the decision on optimization approach in the target data model by analyzing the inputs from the data model analyzer 207, data distribution and storage space analyzer 208 with respect to knowledge in the knowledge base 204. The above analysis is based on design and tuning techniques with respect to different database platforms (i.e., the source data platform and the target data platform). The recommendation module 205 also verifies the schema or data definition language (DDL) script to find out design defects based on the pre-defined business rules and industry standards with respect to database design principles provided by the knowledge base 205. The recommendation module 205 further analyzes data structures related to keys, indexes, columns, and relationships among the data entities (e.g., table) and data entity types. The recommendation module 205 further verifies the violation of relational database design rules as per On-line Transaction Processing (OLTP) and data warehouse design best practices point of view. For example, some of the typical business rules or best practices may include database or table may have a primary key, primary key with one or more than one number of columns with number or integer data types, and so forth. The recommendation module 205 then establishes common trends or patterns to determine the optimal solution to achieve performance and storage scalability in the target platform as part of database migration.

By way of an example, the recommendation module 205 may identify the top N resource intensive queries in the source data platform and identify the bottlenecks with respect to full database scans, costly joins, Input/Output, memory, CPU, degree of parallelism, compression level, index usage, partition usage, and so forth. The above parameters identified may then be employed to determine the right optimization processes such as correct usage of indexes (e.g., unique index, primary index, secondary index, partition index, zone maps, etc.), partitioning on the database with partition methods (e.g., range partitioning, multilevel partitioning, etc.), compression techniques (e.g., hybrid columnar compression, block level compression, multi value compression, etc.), and/or other recommendations (e.g., parallelism, hints, materialized views, etc.). These optimization recommendations may then be provided to the migration module 206.

The migration module 206 uses the optimization recommendations for generating the database migration roadmaps by considering all the component inputs and identifying the order of steps to be followed in executing the database migration scripts. Based on the recommendations from the recommendation module 204 and any specific inputs from the user captured by the source-target metadata mapper 209, the script generator 211 produces the various target migration optimization scripts for the target physical data model to achieve scalability and performance. Once target data model is ready, with source-target mapping inputs and user preferences, the performance data mover 210 identifies best ways (e.g., parallel approach, multithreads approach, etc.) to extract data from source database and create flat files. Additionally, the data mover 210 moves the files to the target platform 202.

The scripts generator 211 then executes various data loading and data movement scripts, data reconciliation scripts in the target platform as per the database migration and optimization standpoint. After that, the optimization scripts based on recommendations from the recommendation module 205 are executed on the target platform 202. After the database migration is performed, the database migration reports with details of the migration and data reconciliation may be generated. Further, the knowledge base 204 may be updated with the details of the database migration to build on the knowledge. The knowledge may be used for future database migration analysis by the recommendation module 205.

As will be appreciated by one skilled in the art, a variety of processes may be employed for performing database migration. For example, the exemplary system 100 and the associated optimized database platform migration engine 200 may perform database migration by the processes discussed herein. In particular, as will be appreciated by those of ordinary skill in the art, control logic and/or automated routines for performing the techniques and steps described herein may be implemented by the system 100 and the associated optimized database platform migration engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
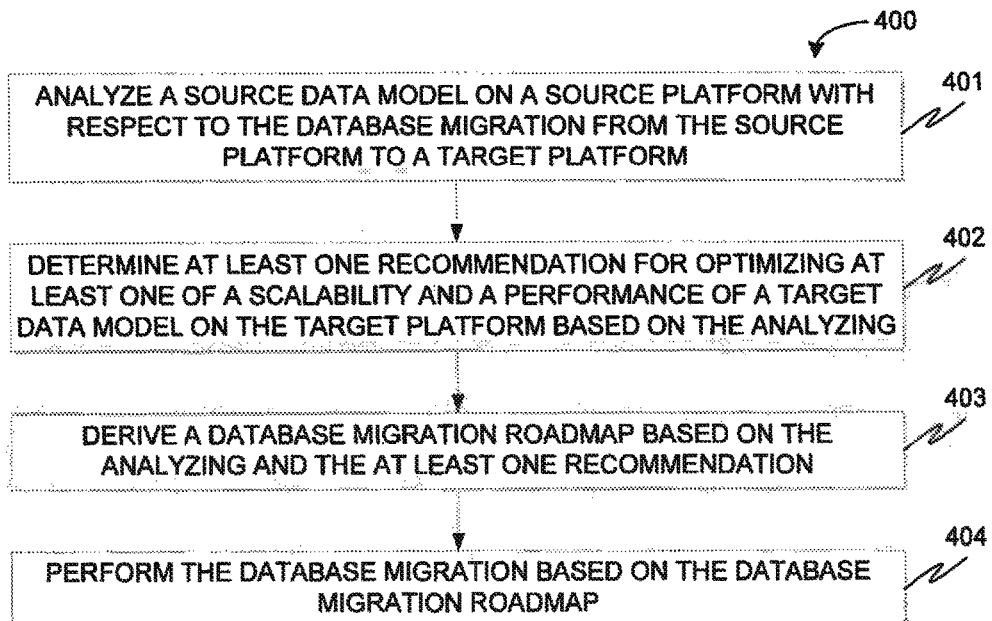
FIG. 4 is a flow diagram of an exemplary process for performing database migration in accordance with some embodiments of the present disclosure.

For example, referring now to FIG. 4, exemplary control logic 400 for performing a database migration from a source platform to a target platform via a system, such as system 100, is depicted via a flowchart in accordance with some embodiments of the present disclosure. As illustrated in the flowchart, the control logic 400 includes the steps of analyzing a source data model on the source platform with respect to the database migration from the source platform to the target platform at step 401, determining at least one recommendation for optimizing at least one of a scalability or a performance of a target data model on the target platform based on the analyzing at step 402, deriving a database migration roadmap based on the analyzing and the at least one recommendation at step 403, and performing the database migration based on the database migration roadmap at step 404. In some embodiments, the control logic 400 further includes the step of generating a report on the database migration comprising information on the database migration and a data reconciliation performed after the database migration. It should be noted that, in some embodiments, the at least one recommendation comprises one or more rules with respect to at least one of a database migration practice or an optimization process to be implemented on the target platform.

In some embodiments, analyzing the source data model at step 401 comprises analyzing a source database for at least one of a data structure, a data entity type, a data entity size, a data index, a data partitioning, a data entity relationship, a data constraint, a data demographic, a data distribution, a data storage pattern, or a resource utilization. Further, in some embodiments, determining the at least one recommendation at step 402 comprises querying a knowledge base for the at least one recommendation, wherein the knowledge base comprises a plurality of pre-defined rules with respect to database migration practices and optimization processes for a plurality of platforms. In some embodiments, the control logic 400 further includes the step of updating the knowledge base with a plurality of new rules with respect to new database migration practices and new optimization processes for the plurality of platforms based on intelligence gathered from a plurality of industry releases or from a plurality of historical database migrations performed.

Additionally, in some embodiments, deriving the database migration roadmap at step 403 comprises generating automated scripts for at least of the target data model creation, data extraction, data transformation, data conversion, data movement, data mapping, data loading, data reconciliation, data validation, and data optimization for at least one of the scalability or the performance. In some embodiments, deriving the database migration roadmap at step 403 further comprises determining an order to be followed in executing the automated scripts. Moreover, in some embodiments, deriving the database migration roadmap at step 403 comprises considering one or more inputs provided by the user with respect to the database migration, wherein the one or more inputs comprises at least one of transformation rules, migration rules, business rules, changes to data objects, or user-defined optimization processes for generation or execution of the automated scripts.

In some embodiments, performing the database migration at step 404 comprises implementing the database migration roadmap on the target platform by executing the automated scripts. Further, in some embodiments, performing the database migration at step 404 comprises creating the target data model on the target platform, optimizing the target data model for at least one of the scalability or the performance, and performing the database migration based on the optimized target data model in accordance with one or more rules.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above provide an end-to-end platform independent solution to automate the entire database migration process across database platforms with scalability and performance optimizations on the target platform as a part of database migration process. As discussed above, the techniques analyze the source platform on the fly based on predefined business rules and best practices with respect to the target platform and provide optimization recommendations. The techniques then perform the required optimization dynamically on database or schema in the target platform based on the optimization recommendations. The techniques therefore provide an optimized target data model that achieves performance and scalability. The techniques also provide for data validation, data reconciliation, and report generation with respect to the database migration performed. Additionally, the techniques generate knowledge based on learning from each database migration performed so as to update the knowledge base for subsequent use.

Thus, in some embodiments, the techniques described in the various embodiments discussed above analyzes source platform, identify pain areas, optimizes data structures with respect to the target platform, recommend best practices with respect to the target platform, checks and validates data between the source and the target at each character level for each record, and performs optimization of the target data platform. Further, as will be appreciated by those skilled in the art, the techniques may be employed to provide data platform migration as well as data platform transformation.

The specification has described system and method for performing database migration. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing a database migration from a source platform to a target platform, the method comprising:
    analyzing, via a processor, a source data model on the source platform with respect to the database migration from the source platform to the target platform;
    determining, via the processor, at least one recommendation for optimizing at least one of a scalability or a performance of a target data model on the target platform based on the analyzing;
    deriving, via the processor, a database migration roadmap based on the analyzing and the at least one recommendation, wherein the deriving the database migration roadmap further comprises generating, via the processor, automated scripts for at least one of the target data model creation, data extraction, data transformation, data conversion, data movement, data mapping, data loading, data reconciliation, data validation, and data optimization for at least one of the scalability or the performance; and
    performing, via the processor, the database migration based on the database migration roadmap.

2. The method of claim 1, wherein the analyzing the source data model further comprises analyzing, via the processor, a source database for at least one of a data structure, a data entity type, a data entity size, a data index, a data partitioning, a data entity relationship, a data constraint, a data demographic, a data distribution, a data storage pattern, or a resource utilization.

3. The method of claim 1, wherein the determining the at least one recommendation further comprises querying, via the processor, a knowledge base for the at least one recommendation, wherein the knowledge base comprises a plurality of pre-defined rules with respect to database migration practices and optimization processes for a plurality of platforms.

4. The method of claim 3, further comprising updating, via the processor, the knowledge base with a plurality of new rules with respect to new database migration practices and new optimization processes for the plurality of platforms based on intelligence gathered from a plurality of industry releases or from a plurality of historical database migrations performed.

5. The method of claim 1, wherein the at least one recommendation comprises one or more rules with respect to at least one of a database migration practice or an optimization process to be implemented on the target platform.

6. The method of claim 1, wherein the deriving the database migration roadmap further comprises determining, via the processor, an order to be followed in executing the automated scripts.

7. The method of claim 1, wherein the deriving the database migration roadmap further comprises considering, via the processor, one or more inputs provided by the user with respect to the database migration, wherein the one or more inputs comprises at least one of transformation rules, migration rules, business rules, changes to data objects, or user-defined optimization processes for generation or execution of the automated scripts.

8. The method of claim 1, wherein the performing the database migration further comprises implementing, via the processor, the database migration roadmap on the target platform by executing the automated scripts.

9. The method of claim 1, wherein the performing the database migration further comprises:
    creating, via the processor, the target data model on the target platform;
    optimizing, via the processor, the target data model for at least one of the scalability or the performance; and
    performing, via the processor, the database migration based on the optimized target data model in accordance with one or more rules.

10. The method of claim 1, further comprising generating, via the processor, a report on the database migration comprising information on the database migration and a data reconciliation performed after the database migration.

11. A system for performing a database migration from a source platform to a target platform, the system comprising:
    a processor; and
    a memory communicatively coupled to the processor, wherein the memory stores the processor-executable instructions, which, on execution, causes the processor to:
        analyze a source data model on the source platform with respect to the database migration from the source platform to the target platform;
        determine at least one recommendation for optimizing at least one of a scalability and a performance of a target data model on the target platform based on the analyzing;
        derive a database migration roadmap based on the analyzing and the at least one recommendation, wherein for the derive the database migration roadmap, the one or more processors are further configured to generate automated scripts for at least one of the target data model creation, data extraction, data transformation, data conversion, data movement, data mapping, data loading, data reconciliation, data validation, and data optimization for at least one of the scalability or the performance; and perform the database migration based on the database migration roadmap.

12. The system of claim 11, wherein for the analyze the source data model the one or more processors are further configured to be capable of executing the programmed instructions stored in the memory to:

analyze a source database for at least one of a data structure, a data entity type, a data entity size, a data index, a data partitioning, a data entity relationship, a data constraint, a data demographic, a data distribution, a data storage pattern, and a resource utilization.

13. The system of claim 11, wherein for the determine the at least one recommendation the one or more processors are further configured to be capable of executing the programmed instructions stored in the memory to:

query a knowledge base for one or more rules with respect to at least one of a database migration practice or an optimization process to be implemented on the target platform, wherein the knowledge base comprises a plurality of pre-defined rules with respect to database migration practices and optimization processes for a plurality of platforms, and wherein the knowledge base is updated with a plurality of new rules with respect to new database migration practices and new optimization processes for the plurality of platforms based on intelligence gathered from a plurality of industry releases or from a plurality of historical database migrations performed.

14. The system of claim 11, wherein for the derive the database migration roadmap the one or more processors are further configured to be capable of executing the programmed instructions stored in the memory to:

determine an order to be followed in executing the automated scripts; and consider one or more inputs provided by the user with respect to the database migration, wherein the one or more inputs comprises at least one of transformation rules, migration rules, business rules, changes to data objects, or user-defined optimization processes for generation or execution of the automated scripts.

15. The system of claim 11, wherein for the perform the database migration the one or more processors are further configured to be capable of executing the programmed instructions stored in the memory to:

implement the database migration roadmap on the target platform by executing the automated scripts.

16. The system of claim 11, wherein for the perform the database migration the one or more processors are further configured to be capable of executing the programmed instructions stored in the memory to:

create the target data model on the target platform;

optimize the target data model for at least one of the scalability or the performance; and perform the database migration based on the optimized target data model in accordance with one or more rules.

17. The system of claim 11, wherein the one or more processors are further configured to be capable of executing the programmed instructions stored in the memory to:

generate a report on the database migration comprising information on the database migration and a data reconciliation performed after the database migration.

18. A non-transitory computer-readable medium storing computer-executable instructions for:

analyzing a source data model on the source platform with respect to the database migration from the source platform to the target platform;

determining at least one recommendation for optimizing at least one of a scalability or a performance of a target data model on the target platform based on the analyzing;

deriving a database migration roadmap based on the analyzing and the at least one recommendation, wherein the deriving the database migration roadmap further comprises generating automated scripts for at least one of the target data model creation, data extraction, data transformation, data conversion, data movement, data mapping, data loading, data reconciliation, data validation, and data optimization for at least one of the scalability or the performance; and performing the database migration based on the database migration roadmap.

* * * * *